US005474346A

United States Patent [19]

Fann et al.

[11] Patent Number: 5,474,346

[45] Date of Patent: Dec. 12, 1995

[54] FACE PLATE ADAPTED TO BE INSERTED INTO A BORE OF A DOOR

[75] Inventors: Yaw-Shin Fann; San-Yi Lin; Rong-Faa Wu; Ching-Chuan Kuo; Lan-Kun Don, all of Chiayi, Taiwan

[73] Assignee: Tong Lung Metal Industry Co., Ltd., Chiayi, Taiwan

[21] Appl. No.: 166,088

[22] Filed: Dec. 10, 1993

Related U.S. Application Data

[63] Continuation-in-part of Ser. No. 60,232, May 10, 1993, abandoned.

[51] Int. Cl.$^6$ .............................. E05B 9/00; F16B 21/18

[52] U.S. Cl. .................................. 292/337; 292/DIG. 53; 411/353; 411/517

[58] Field of Search ............................ 292/337, DIG. 53, 292/DIG. 60, DIG. 64, 1.5; 70/449, 450; 411/517, 520, 521, 353, 528, 529, 547; 403/371, 365

[56] References Cited

U.S. PATENT DOCUMENTS

| | | | |
|---|---|---|---|
| 2,328,757 | 9/1943 | Tinnerman | 411/520 |
| 3,006,675 | 10/1961 | Erickson | 292/337 |
| 3,055,691 | 9/1962 | Kessel | 292/337 |
| 3,190,683 | 6/1965 | Schlage | 292/337 |
| 3,838,928 | 10/1974 | Blaurock et al. | 411/517 X |
| 4,372,594 | 2/1983 | Gater | 292/337 |
| 4,664,433 | 5/1987 | Solovieff | 292/337 |
| 5,039,146 | 8/1991 | Lin | 292/337 |
| 5,094,488 | 3/1992 | Boadwine | 292/DIG. 53 X |
| 5,211,432 | 5/1993 | Lin | 292/337 |

FOREIGN PATENT DOCUMENTS

| | | |
|---|---|---|
| 76206703 | 10/1982 | Taiwan . |

*Primary Examiner*—Rodney M. Lindsey
*Attorney, Agent, or Firm*—Ladas & Parry

[57] ABSTRACT

A face plate includes a tubular member for freely and rotatably receiving a latch housing and having a first end and a second end. An opening is formed in the first end through which a latch bolt passes and has a diameter smaller than an outer diameter of the latch housing. The second end of the tubular member has an inner diameter smaller than the outer diameter of the latch housing. A flange extends radially and outwardly from the first end of the tubular member. The tubular member further has a plurality of axially extending projections formed on an outer periphery thereof.

5 Claims, 7 Drawing Sheets

FACE PLATE ADAPTED TO BE INSERTED INTO A BORE OF A DOOR

CROSS-REFERENCES TO RELATED APPLICATIONS

This is a continuation-in-part application of U.S. patent application Ser. No. 08/060,232 filed on May 10, 1993, now abandoned.

BACKGROUND OF THE INVENTION

1. Field of the Invention

The present invention relates to a face plate and a retainer which are adapted to be inserted into a bore of a door for rotatably receiving a tubular latch housing.

2. Description of the Related Art

U.S. Pat. No. 3,190,683 issued to E. L. Schlage discloses a retainer and tubular latch housing to correctly orient the latch bolt. U.S. Pat. No. 5,039,146 issued to Jui C. Lin discloses a tubular latch housing to obviate the shortcoming that might result from improper pinching force of the sleeve of Schlage against the latch housing. However, in the structure by Lin, if the internal parts of the latch housing which are received in the bore of the door are damaged, it is difficult to remove the damaged latch housing from the outer side of the bore of the door due to the existence of the ring 11, while, in the Schlage's design, it is impossible to remove the damaged latch housing from the outer side of the bore of the door. A further shortcoming of the design of Lin is that the thickness of the door must exceed a certain extent so as to accommodate the whole arrangement. Therefore, there has been a long and unfulfilled need for an improved face plate or retainer to solve these problems without affecting free rotation of the latch housing.

SUMMARY OF THE INVENTION

In accordance with one aspect of the invention, a face plate/retainer is substantially a tubular member having a front end and a rear end. An opening is formed in the front end through which the latch bolt passes and has a diameter smaller than an outer diameter of the latch housing. An inner diameter of the tubular member is slightly greater than the outer diameter of the latch housing, while the rear end thereof has an inner diameter smaller than the outer diameter of the latch housing, such that the tubular member is freely rotatable about the latch housing as a loose bearing. A flange extends radially and outwardly from the front end of the tubular member to prevent axial movement between the tubular member and the door.

The tubular member further includes a plurality of axially extending projections which are formed on an outer periphery thereof and which preferably taper from the front end to the rear end thereof to catch the peripheral wall of the bore for preventing rotational movement between the tubular member and the peripheral wall of the bore.

In accordance with another aspect of the invention, there is provided a sleeve for a latch housing which includes an axial split extending from a first end thereof to a second end thereof. The sleeve further includes a plurality of rows of spaced knurls formed on an outer periphery thereof, each knurl having a first inclined surface which faces the first end of the sleeve and a second inclined surface which faces the second end of the sleeve. Preferably, the tops of each row of the knurls gradually declines from the first end to the second end of the sleeve.

The sleeve is mounted around the latch housing such that the sleeve is freely rotatably about a longitudinal axis of the latch housing as a loose bearing. When the sleeve as well as the latch housing is mounted into the bore of the door, the knurls catch the wall of the bore thereby preventing rotational movement of the sleeve yet allowing free rotational movement of the latch housing relative to the sleeve in order to correctly orient the latch housing if necessary. The declination of the tops of the knurls and the provision of the inclined surfaces thereof facilitate the installation and removal of the sleeve and the latch housing, which is particularly useful when the internal parts of the latch housing which are received in the bore are damaged.

Other objects, advantages, and novel features of the invention will become more apparent from the following detailed description when taken in conjunction with the accompanying drawings.

DESCRIPTION OF THE PREFERRED EMBODIMENTS

Figure 1:
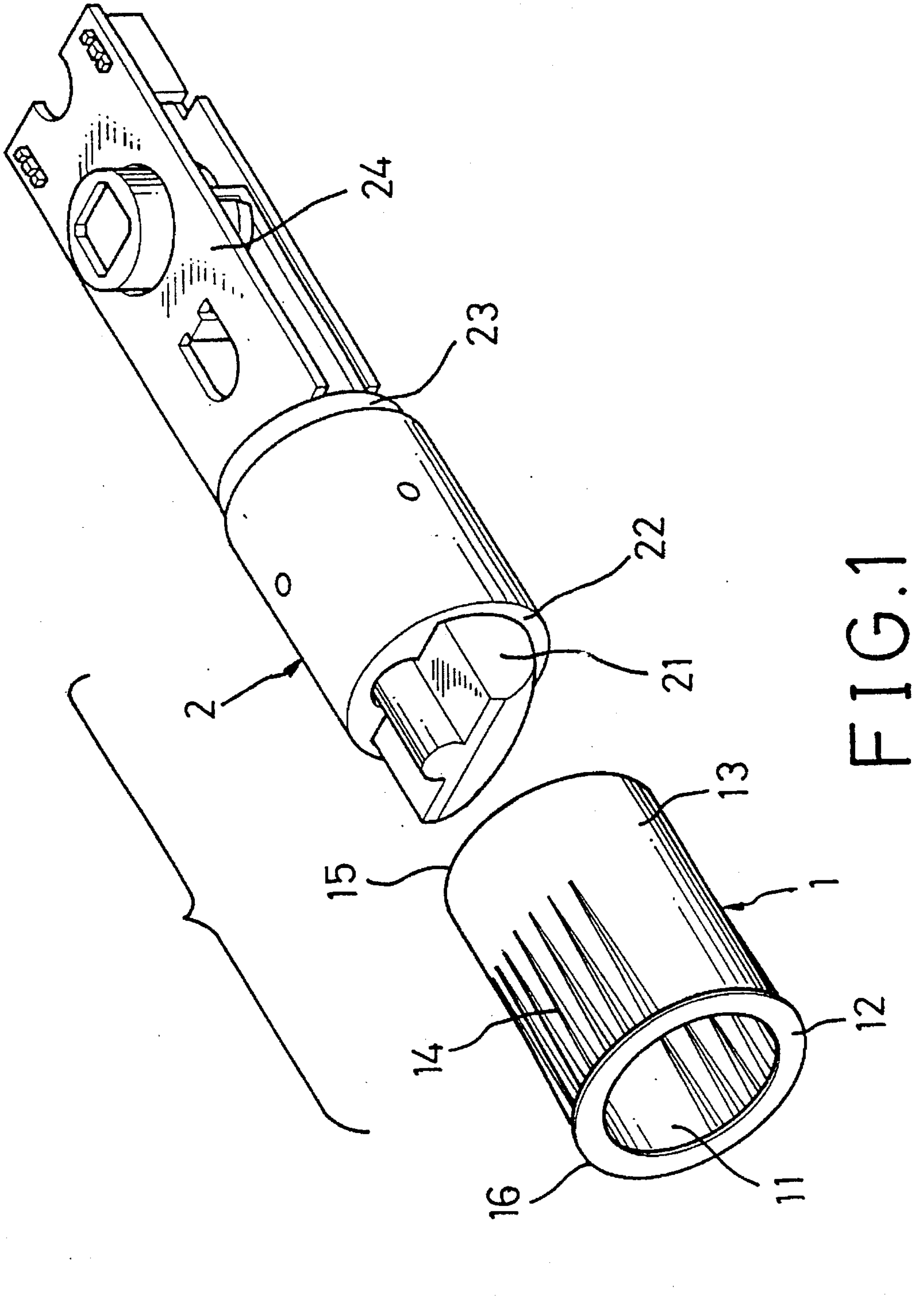
FIG. 1 is a perspective view of a latch housing and a face plate/retainer in accordance with the present invention.
Figure 2:
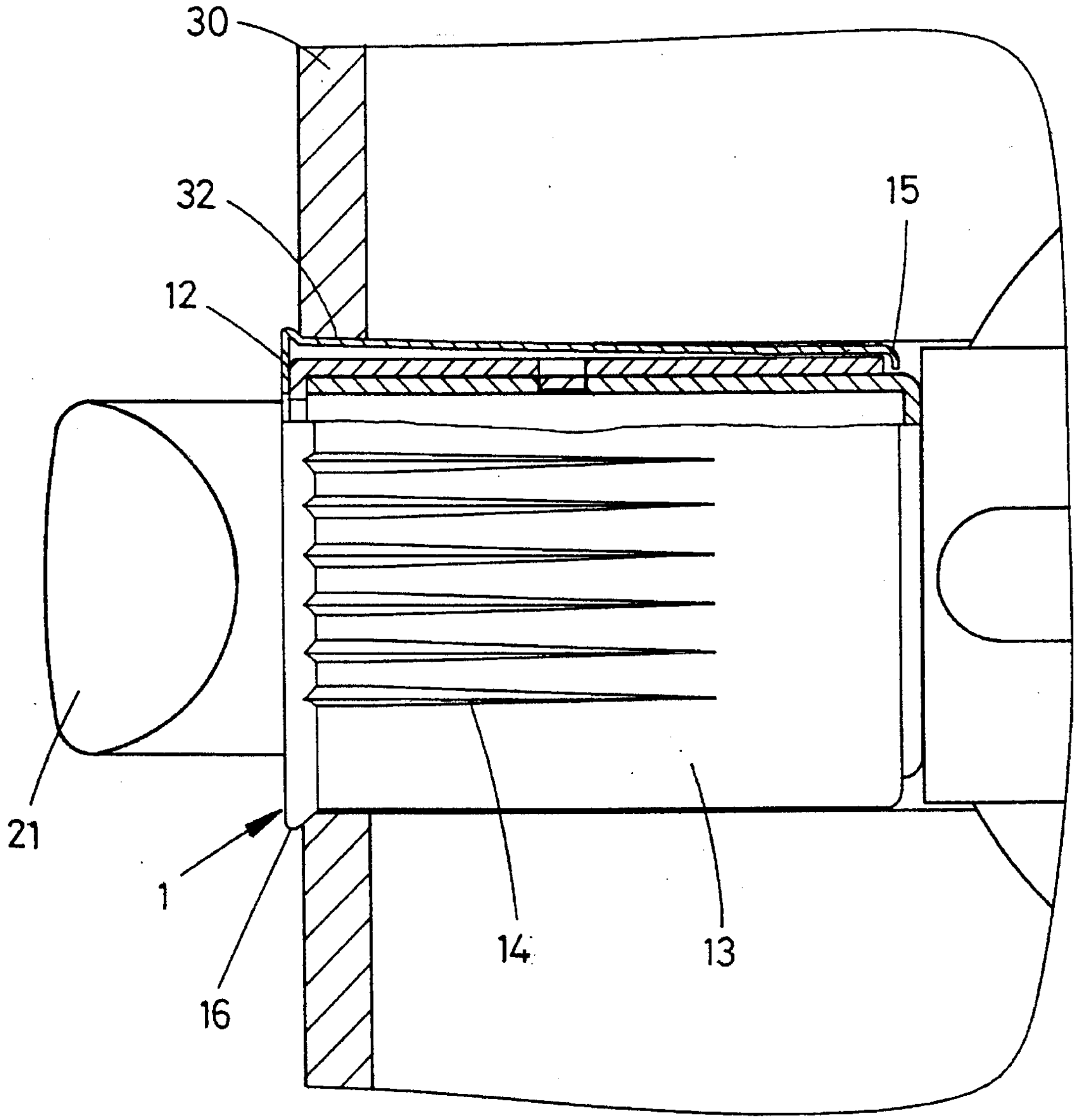
FIG. 2 is a schematic side elevational view, partly in section, of a face plate/retainer and a latch housing mounted in a bore of a door.

Referring to the drawings and initially to FIGS. 1 and 2, a face plate/retainer in accordance with the present invention is designed to be inserted to a bore 32 of a door 30 for rotatably receiving a latch housing 2 to correctly orient the latch bolt 21. The face plate/retainer is a tubular member 1 having a front end 12 and a rear end 15. An opening 11 is formed in the front end 12 through which the latch bolt 21 passes and has a diameter smaller than an outer diameter of the latch housing 2.

An inner diameter of the tubular member 1 is slightly greater than the outer diameter of the latch housing 2, while the rear end 15 thereof has an inner diameter smaller than the outer diameter of the latch housing 2, such that the tubular member 1 is freely rotatable about the latch housing 2 as a loose bearing. In manufacturing, the tubular member 1 is initially of the same inner diameter along a longitudinal direction thereof except in the opening 11 in the front end 12 thereof. When the latch housing 2 is received in the tubular member 1 from a front end 22 thereof, the rear end 15 of the tubular member 1 is punched to reduce the inner diameter so as to restrain a rear end 23 of the latch housing 2 yet still allow relative free rotation between the tubular member 1 and the latch housing 2 (see FIG. 2). A flange 16 extends radially and outwardly from the front end 12 of the tubular member 1 to prevent axial movement between the tubular member 1 and the door 30.

Figure 3:
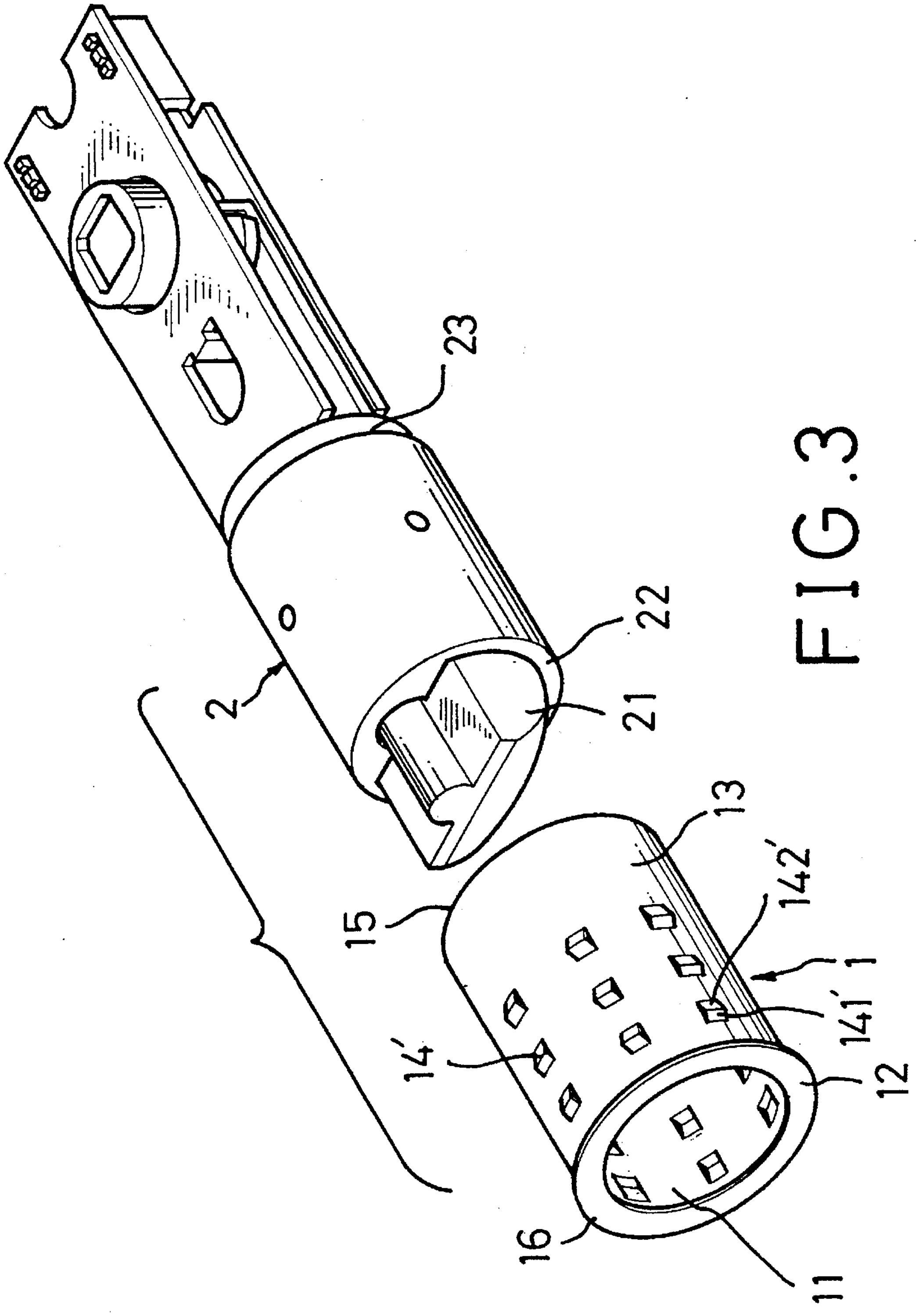
FIG. 3 is a perspective view of a latch housing and another embodiment of a face plate/retainer in accordance with the present invention.

A plurality of axially extending tooth-like straight ridges 14, which preferably decline from the front end 12 to the rear end 15, are formed on an outer periphery of the tubular member 1 to catch the peripheral wall of the bore 32 when mounting the tubular member 1 and the latch housing 2 in the bore 32, thereby preventing relative rotational movement between the tubular member 1 and the peripheral wall of the bore 32. FIG. 3 shows another embodiment of the tubular member 1 in which the axially extending tooth-like straight ridges 14 are replaced by a plurality rows of axially spaced ridges 14'. Each ridge 14' includes a first inclined surface 141' facing the front end 12 and a second inclined surface 142' facing the rear end 15 for easily mounting of the tubular member 1 and the latch housing 2 into the bore 32 or removal therefrom.

By such an arrangement, the latch housing 2 and the tubular member 1 can be easily mounted into the bore 32 of the door 30 by simply inwardly punching the tubular member 1 at the flange 16 to forcibly mount the tubular member 1 and the latch housing 2 in the bore 32 with the latch housing 2 readily rotatable so as to be adjusted to a correct orientation. When the internal parts of the latch housing 2, which are received in the bore 32 and thus inaccessible, are damaged, one may easily remove the tubular member 1 and the latch housing 2 from the outer end of the bore 32 by means of suitable tools striking on proper locations, such as striking the latch assembly 24 attached to the rear end of the latch housing 2 or striking against an inner surface of the flange 16 of the tubular member 1.

Figure 4:
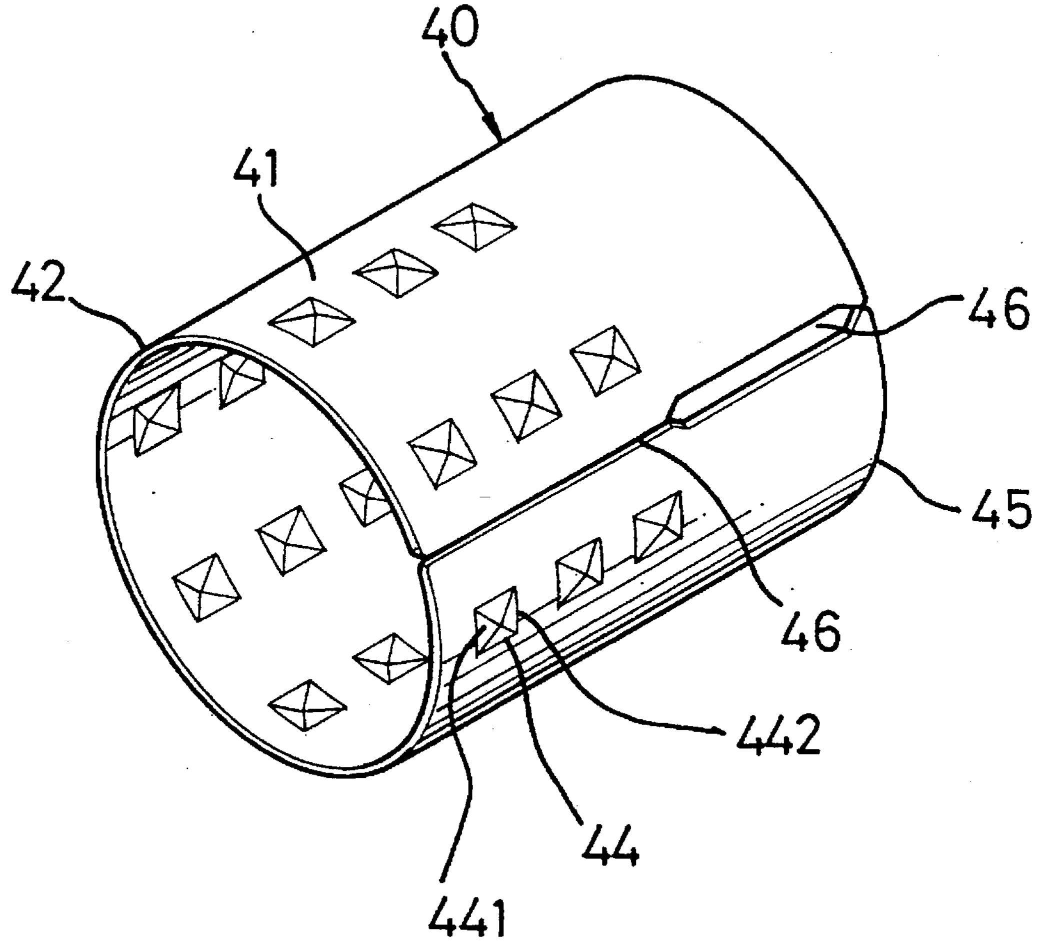
FIG. 4 is a perspective view of a retainer in accordance with the present invention for a tubular latch housing.

FIG. 4 illustrates another embodiment of the invention which is particularly designed to improve the sleeve 41 disclosed in U.S. Pat. No. 3,190,683 to Schlage. The retainer of the invention is substantially a sleeve designated by "40" and includes an axial split 46 extending from a first end 42 thereof to a second end 45 thereof. The sleeve 40 further includes a plurality of rows of spaced knurls 44 formed on an outer periphery 41 thereof, each knurl 44 having a first inclined surface 441 which faces the first end 42 and a second inclined surface 442 which faces the second end 45. Preferably, the tops of each row of the knurls 44 gradually declines from the first end 42 to the second end 45 of the sleeve 40 shown in FIG. 6A where the knurl in the middle is shorter than the knurl adjacent the first end by a height D and higher than the knurl next farthest from the first end 42 toward the second end 45 (FIGS. 4, 5 and 6) by a height L.

Figure 5:
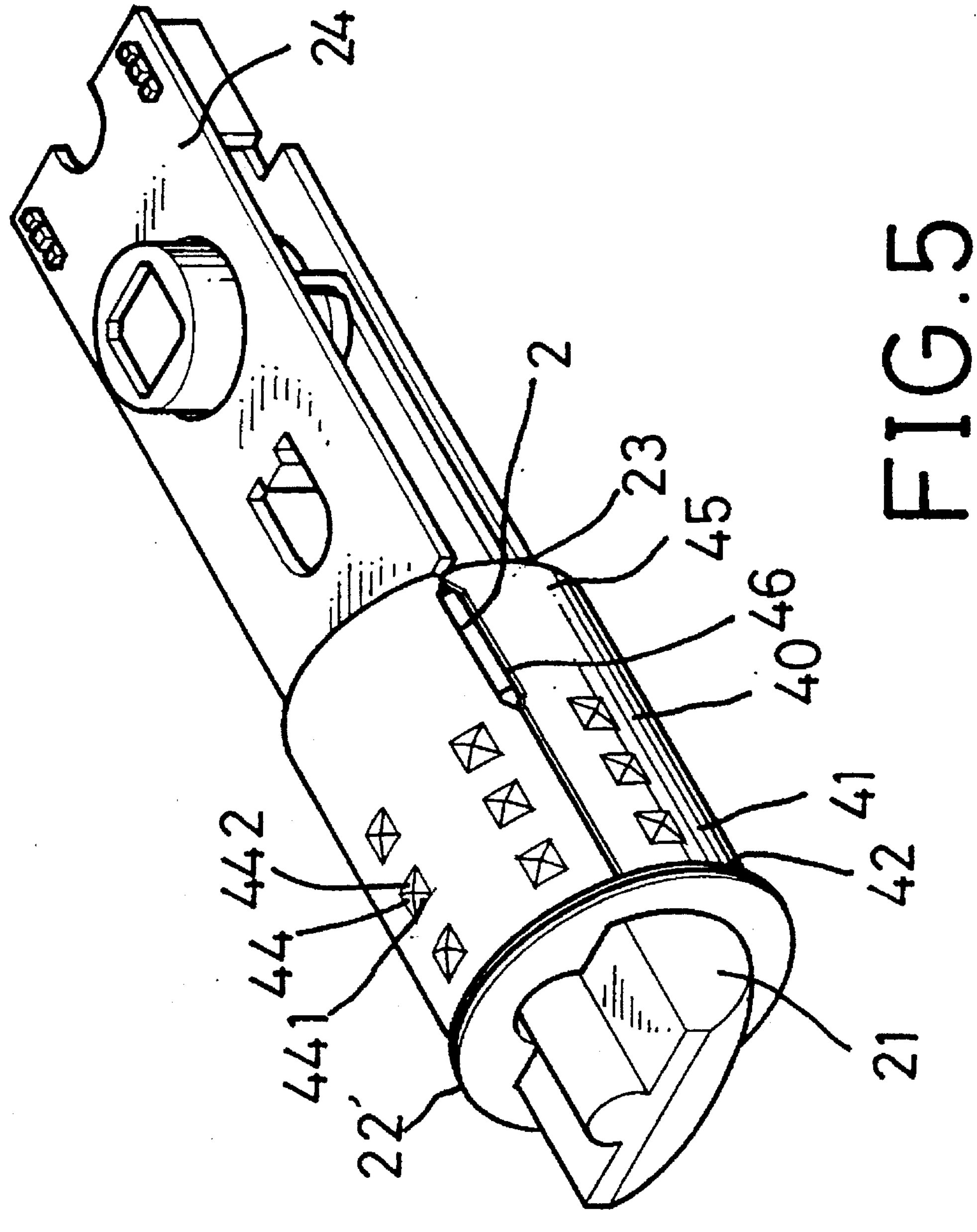
FIG. 5 is a perspective view of the retainer in FIG. 4 mounted around a tubular latch housing.
Figure 6:
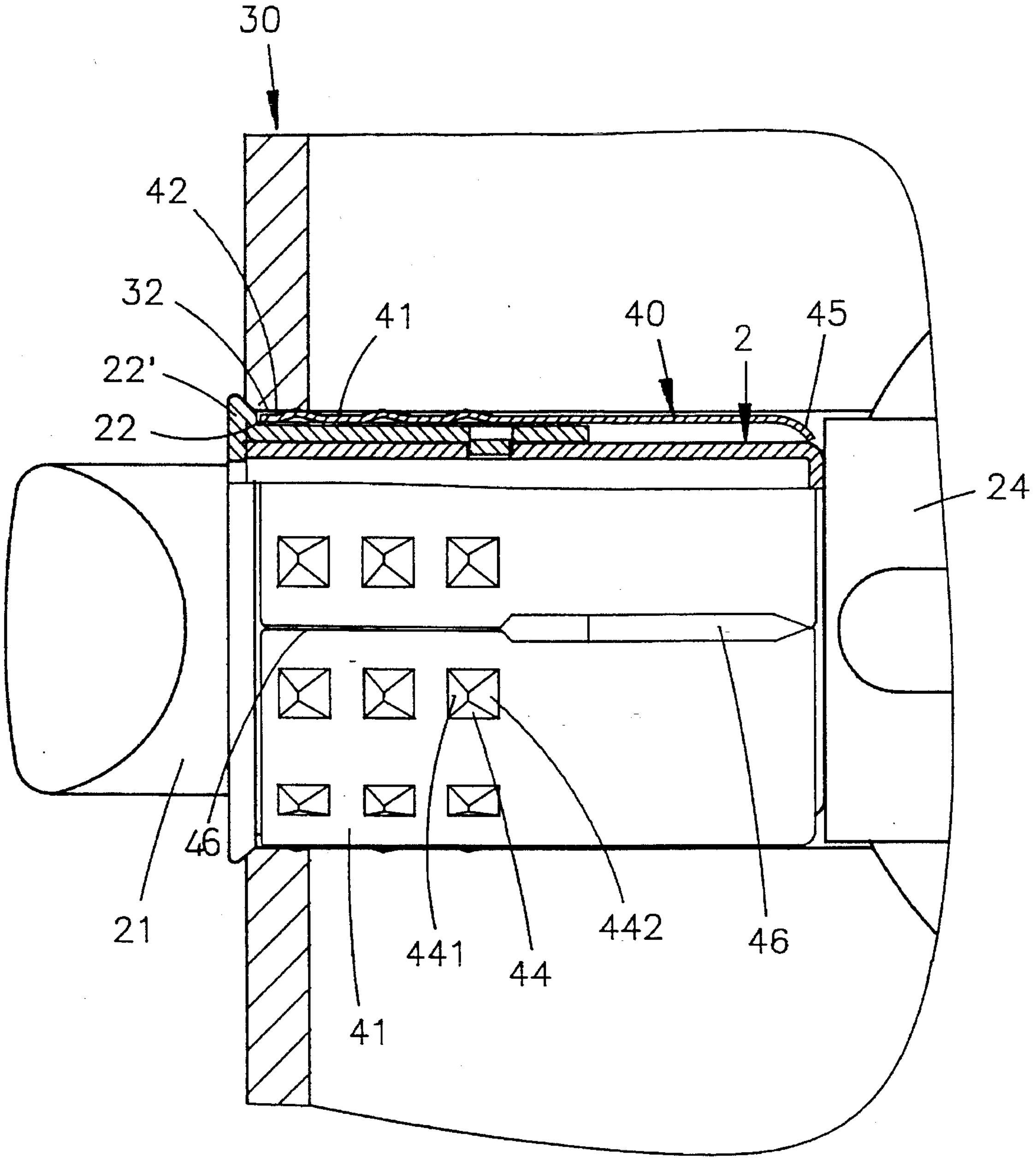
FIG. 6 is a schematic side elevational view, partly in section, of the retainer and the tubular latch housing mounted in a bore of a door.
Figure 6A:
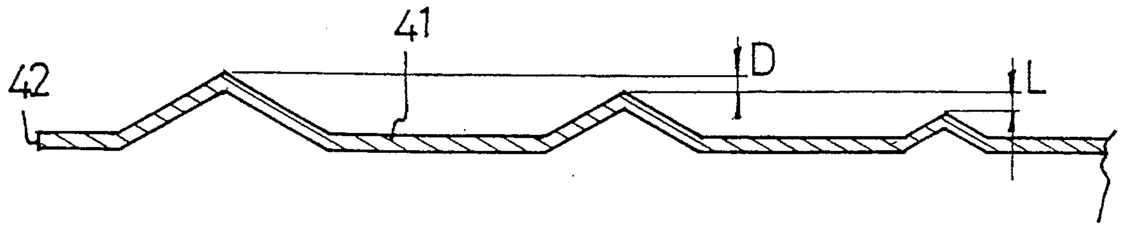
FIG. 6A is a partial, enlarged, sectional side elevational view showing tops of knurls declining from a first end toward a second end of the retainer.

The sleeve 40 is mounted around the latch housing 2 such that the sleeve 40 is freely rotatably about a longitudinal axis of the latch housing 2 as a loose bearing. Referring to FIGS. 5 and 6, when the sleeve 40 as well as the latch housing 2 are mounted into the bore 32 of the door 30, the knurls 44 catch the wall of the bore 32 thereby preventing rotational movement of the sleeve 40 while allowing free rotational movement of the latch housing 2 relative to the sleeve 40 in order to correctly orient the latch housing 2 if necessary. An axially inward force is applied to a flange 22' which has an outer diameter greater than the diameter of the bore and which is formed on the front end 22 of the latch housing 2 adjacent to the latch bolt 21 housed therein to drive the flange 22' into the wood, thereby completing the installation. The declination of the tops of the knurls 44 and the provision of the second inclined surfaces 442 thereof facilitate the installation.

When the internal parts of the latch housing 2 which are received in the bore 32 are damaged, one may easily remove the latch housing 2 as well as the sleeve 40 from the outer end of the bore 32 due to the provision of the first inclined surfaces 441 of knurls 44 and the declination of the tops of the knurls 44.

Although the invention has been explained in relation to its preferred embodiment, it is to be understood that many other possible modifications and variations can be made without departing from the spirit and scope of the invention as hereinafter claimed.

We claim:

1. A face plate adapted to be inserted into a bore in a door, comprising:

a tubular member for freely and rotatably receiving a latch housing and having a first end and a second end, an opening being formed in the first end through which a latch bolt passes and having a diameter smaller than an outer diameter of the latch housing, the second end of the tubular member having an inner diameter smaller than the outer diameter of the latch housing, a flange extending radially and outwardly from the first end thereof of the tubular member, and means provided on an outer periphery of the tubular member for preventing rotational movement between the tubular member and the door.

2. The face plate as claimed in claim 1 wherein the means for preventing rotational movement includes a plurality of axially extending projections tapering from the first end to the second end of the tubular member.

3. The face placed as claimed in claim 2 wherein the axially extending projections are tooth-like straight ridges.

4. The face plate as claimed in claim 1 wherein the means for preventing rotational movement includes a plurality rows of axially spaced ridges, each of the ridges includes a first inclined surface which faces the first end of the tubular member and a second inclined surface which faces the second end of the tubular member.

5. A retainer for a tubular latch housing, comprising:

a sleeve for freely and rotatably receiving a latch housing and having an outer periphery and first and second axially opposite ends, an axial split extending from the first end to the second end of the sleeve, and a plurality of rows of spaced knurls on the outer periphery of the sleeve, each knurl having a first inclined surface which faces the first end of the sleeve and a second inclined surface which faces the second end of the sleeve, and each row of the knurls having tops which gradually decline from the first end to the second end of the sleeve.

* * * * *